United States Patent [19]

Stückrad et al.

[11] Patent Number: 5,566,832

[45] Date of Patent: Oct. 22, 1996

[54] METHOD FOR SORTING PLASTICS FROM A PARTICLE MIXTURE COMPOSED OF DIFFERENT PLASTICS

[75] Inventors: Björn Stückrad; Karsten Löhr, both of Ulm, Germany

[73] Assignee: Daimler-Benz AG, Stuttgart, Germany

[21] Appl. No.: 512,525

[22] Filed: Aug. 7, 1995

[30] Foreign Application Priority Data

Aug. 5, 1994 [DE] Germany .......................... 44 27 718.0
May 31, 1995 [DE] Germany ........................ 195 19 865.4

[51] Int. Cl.$^6$ ..................................................... B03B 1/00
[52] U.S. Cl. ................................................ 209/9; 209/167
[58] Field of Search ................................. 209/3, 4, 5, 9, 209/166, 167, 172, 172.5, 173

[56] References Cited

U.S. PATENT DOCUMENTS

| | | |
|---|---|---|
| 4,046,677 | 9/1977 | Saitoh et al. . |
| 4,132,633 | 1/1979 | Saitoh et al. . |
| 4,167,477 | 9/1979 | Valdez et al. . |
| 4,578,184 | 3/1986 | Rasmussen .................................. 209/3 |
| 4,617,111 | 10/1986 | Grimm et al. ............................... 209/4 |
| 5,022,985 | 6/1991 | Nugent .................................. 209/172.5 |
| 5,120,768 | 6/1992 | Sisson . |
| 5,199,652 | 4/1993 | Mikofalvy et al. ....................... 209/4 X |
| 5,234,110 | 8/1993 | Koblert ................................... 209/3 X |
| 5,248,041 | 9/1993 | Deiringer et al. . |

FOREIGN PATENT DOCUMENTS

| | | |
|---|---|---|
| 2073951 | 2/1993 | Canada . |
| 0535419 | 4/1993 | European Pat. Off. . |

OTHER PUBLICATIONS

"Zur Sortierung reiner und NE–Metalle enthaltende Kunststoffabfälle," A. Bahr, Erzmetall(Jan. 1980), vol. 33, pp. 324–330.

Primary Examiner—D. Glenn Dayoan
Attorney, Agent, or Firm—Evenson, McKeown, Edwards & Lenahan, P.L.L.C.

[57] ABSTRACT

A method for separating plastic particles by types from a particle mixture of plastics of different types by flotation. The plastic particles are initially processed by a type-dependent change in their wetting behavior in such a manner that the various types can be floated individually out of the particle mixture. This surface treatment of the plastic particles takes place prior to flotation and outside of the flotation device in a physically dry manner by plasma processing of the particle mixture followed by storage for a predetermined time period. Storage results in a material-specific classification wetting behavior.

25 Claims, 5 Drawing Sheets

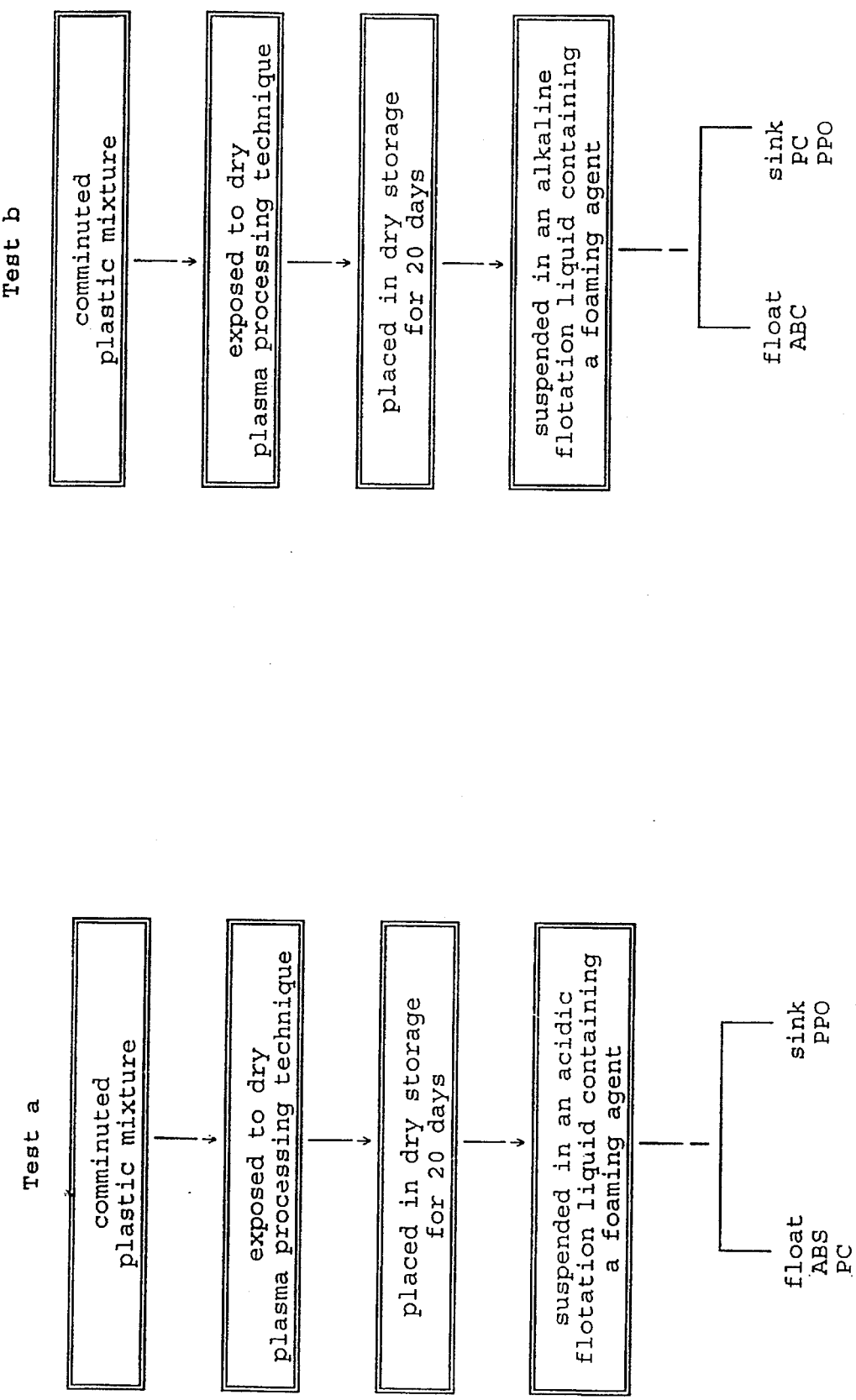

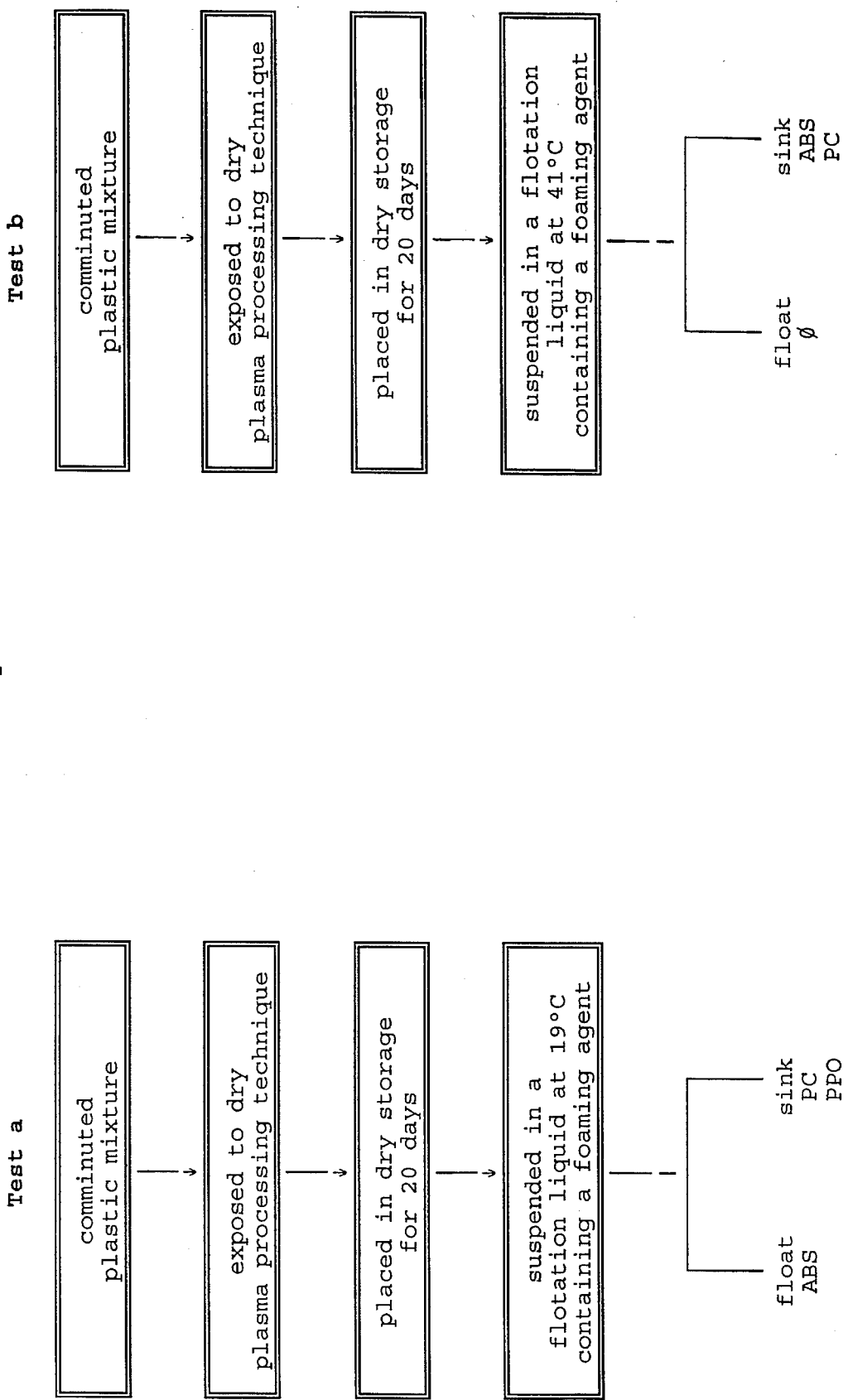

METHOD FOR SORTING PLASTICS FROM A PARTICLE MIXTURE COMPOSED OF DIFFERENT PLASTICS

BACKGROUND AND SUMMARY OF THE INVENTION

The invention relates to a method for sorting plastics from a mixture of particles containing different plastics by flotation.

The effort to reduce the accumulation of trash by recycling the plastics contained in trash has resulted in plastic being collected separately and sent for recycling. It is important in this regard to separate the types of plastics contained in the collected waste plastic. A variety of separating methods have been developed in this regard.

Most of the separating methods in use today are based on utilizing the differences in density of the individual components in the mixture, so that for example plastics are separated using float/sink separation or by cyclones/hydrocyclones (Bahr, Erzmetall, 1980, vol. 33, pp. 324–330). Such methods fail, however, with plastic mixtures whose components have the same or similar densities, but are of different types. However, recycling waste plastic that is as high grade as possible requires separation of the mixture as completely as possible by types.

Another selection feature for sorting plastics, in addition to density sorting, is by wettability of the surface of the plastic. This selection feature is utilized in flotation, with the comminuted plastic mixture being suspended in a liquid (usually water) and being exposed to a stream of rising gas bubbles (usually air). These bubbles, depending on the wettability of the components in the mixture, collect selectively on them. Good wettability of the plastic surface by the suspension liquid results in poor adhesion of the bubbles and vice versa. Most of the plastics used today have a naturally hydrophobic surface, which means that they are poorly wettable by water and therefore collect bubbles readily and then float on the surface of the liquid. Selective accumulation of bubbles and hence sorting by floating and sinking fractions requires selective modification of the natural wettability of the plastic surfaces. Existing methods for sorting plastics using flotation, modify the plastic by chemical treatment of the plastic surface in the suspension liquid. In this connection, we refer to U.S. Pat. Nos. 4,046,677, 4,132,633, 4,167,477, and 5,120,768, CA-PS 2,073,951, and EP 0 535 419 A1, which deal with flotation separation of individual plastics from different groups of plastic mixtures and which propose the chemicals and treatment methods required for this purpose.

Heretofore, surface modification of the plastic particles required for flotation sorting was thus always carried out using a wet technique with chemical treatment, i.e. by adding interface-reactive chemicals directly to the flotation chamber. For economic and ecological reasons, the flotation liquid was recycled. Usually, in addition to the so-called depressant agent required for surface modification, a so-called foaming agent had to be added in order to permit formation of a supporting foam. The concentrations of both agents decrease with time because they are removed by the foam and the plastic. Independent regulation of both concentrations at an optimum level for each is difficult. In addition, a suitable set of agents, namely the depressant and foaming agents, would have to be prepared for each type of plastic, but this has not been done for all types of plastics. Moreover, the discovery of a new agent with selective action is very expensive and cumbersome, at least if its selective effect is to be sufficiently high.

A goal of the present invention is to overcome these disadvantages, and to improve the basic method such that fewer types of chemicals, especially no depressant agents, are required, to simplify the production of optimum flotation conditions and to make possible flotation separation of plastics which formerly could not be separated in this fashion.

These goals are achieved according to the present invention wherein surface modification is accomplished some time before flotation using a dry technique by means of plasma processing. It is important in this regard to maintain a certain storage time during which selectivity of the plasma processing to type adjusts itself automatically. If surface modification is accomplished by means of plasma processing, only the foaming agent needs to be added to the flotation liquid. The adjustment of this one concentration at an optimum level is much simpler.

Sorting by means of flotation is accomplished by utilizing the different wettabilities of the various components in the mixture by the flotation liquid. Most plastic mixtures do not show sufficient differences in their wettability to permit sorting by means of flotation.

Although it is known that wettability of plastics can be adjusted by means of plasma processing, previous results indicate that identical treatment of different plastics merely results in an approximately uniform shift for all types in the mixture rather than in a classification according to a wettability scale. In other words, without plasma processing, all the components in the test mixture are highly hydrophobic; they readily collect bubbles and all float immediately. After plasma processing, they are all highly hydrophilic, accumulate no bubbles, and none of the mixture components floats. We have now recognized, however, that the wettability of the various mixture components that can be adjusted by means of plasma processing, changes at different rates. In other words, the wettability of plastic surfaces adjusted by plasma processing remains effective for different plastics for different lengths of time. After a few days, one mixture component is already highly hydrophobic again, while others are still highly hydrophilic. Such mixtures can be readily sorted by means of flotation according to the present invention.

Thus, for example, the naturally hydrophobic (i.e. not wettable by water) plastics acrylonitrile-butadiene-styrene copolymer (ABS), styrene-acrylonitrile copolymer (SAN), polycarbonate (PC), and polyphenylene oxide (PPO) are rendered hydrophilic by means of plasma processing; none of them collect any air bubbles in a flotation chamber, and they remain in the suspension liquid. The effect of plasma processing on the wettability of ABS, however, is shorter in comparison to the effect on the wettability of the other plastics. Thus, ABS becomes hydrophobic again after only a few days, and readily collects rising air bubbles in the suspension liquid, while the other plastics are still highly hydrophilic, collect no bubbles and sink.

In a mixture of ABS, SAN, PC, and PPO and possibly other plastics, the surface of the ABS can be made more hydrophobic than that of the other plastics by plasma processing and mixture-specific aging time. During subsequent flotation, the ABS floats and can be removed as a foam product, while the other plastics remain in the suspension liquid.

The plastics used are of the types listed above, converted into a comminuted form that floats. The source of the plastics used is unimportant in this regard. Thus, for example, films, fibers, cables, fleeces, knitted fabrics, and other shaped parts may be used.

The size and shape of the plastic pieces used has no particular limitations. For handling reasons, especially pumpability, a suitable size for the plastics used is less than about 20 mm and preferably 2–12 mm. In the meantime, it has been recognized in connection with practicing the present invention that the separating process can also be performed with particles with a length of up to 100 mm on a side. The particle size that is optimum for the separating method is specific to the materials and mixtures and must be optimized empirically on a case-by-case basis. The plastics used are reduced into plastic pieces of the sizes listed above by conventional comminution methods such as chopping, cutting, chipping, or tearing, and also possibly as granulates or chips for flotation. The comminution method used is selected on a case-by-case basis; the optimum choice depending upon the degree of "clumping" of the pieces of the compound.

The mixture of ABS and one or more of the plastics listed above is modified prior to flotation by plasma processing to change its wettability. The plasma in small laboratory-size facilities can be allowed to act for a period of 1 to 60 seconds and preferably 5–10 seconds on the plastic mixture at 10 Pa base pressure. In larger systems, on the industrial scale, with a different plasma chamber and larger loading capacity (1.5 kg), good results have been achieved at approximately 30 Pascals base pressure and 60 to 120 seconds of treatment time. An important point is that the particles should be reliably separated in a shallow, loose pile or in a rotation drum such that all the particles can be reached by plasma processing.

Suitable process gases produce enrichment of the plastic surface with polar functional groups, which contain oxygen, nitrogen, sulfur, or similar polarizing elements (hydroxyl, carboxyl, and/or carbonyl groups, esters, ethers, amines, amides, sulfonates, or the like). Polarized surfaces are readily wettable by polar suspension liquids (water or others), collect gas bubbles poorly, and therefore do not float.

The polar functional groups used represent an excited surface state and possess a high stearic mobility. After a material-specific period of time, these functional groups rotate into a position that is more favorable from the energy standpoint. This explains the material-specific time-dependent change in wettability.

Suitable discontinuously operating plasma chambers for the polarization of plastic surfaces are known from surface activation and cleaning. In addition, treatment sections for plasma processing of substrates that are also useful for the present invention and which operate continuously in an open atmosphere, i.e. under air or possibly under a special gas, have already been developed by other research institutions.

The studies in connection with the present invention were conducted mainly with oxygen as the process gas in plasma processing, and basically positive results were obtained. Nitrogen is also usable for plasma processing in the same way as oxygen. Treatment of the plastic mixture with argon plasma likewise leads to surface modifications that tend in the same direction, although to a lesser degree. Plasma processing of plastics with tetrafluorohydrocarbon increases the hydrophobic nature, which as a rule is high in any case, of the plastics and is therefore not seriously considered. A different material-specific rapid restoration of the artificially increased hydrophobic property, which has however not been investigated, may also occur here and lead to classification of another kind as regards wettability in storage. It may be assumed that a certain type of material in the plasma may have a selective effect during the plasma processing of individual plastics in a mixture; for example it has been reported that plasma processing with a noble gas plasma triggers crosslinking reactions, and these reactions act selectively as regards to the molecular weight of polyolefins such as polyethylene (PE) and polypropylene (PP).

Following plasma processing and after a mixture-specific aging period, the plastic mixture is placed in a flotation chamber. The plastics are suspended in the chamber in a polar, preferably aqueous, solution. Usually the aqueous solution is composed of water, but water containing salt can also be used. Examples from the literature for salt water versions that are suitable for flotation purposes include sea water, brine, bitter water (water containing magnesia), as well as aqueous solutions that contain halides and/or sulfates.

The aqueous solution contains a flotation foamer which serves to form a supporting layer of foam as well as to reduce coagulation of the bubbles and thus contribute to the formation of a relatively narrow bubble size spectrum.

Suitable flotation foamers referred to in the literature include:

aliphatic and cycloaliphatic alcohols with 5 to 10 carbon atoms, or polyglycols with a molecular weight (weight average) of 200 to 500, for example polyalkylene glycol (Flotanol® C7; manufactured by Hoechst AG), or alkylpolyglycol ether with a molecular weight of 200 to 500 (Flotanol® D14; made by Hoechst AG).

The concentration of flotation foamer used is between 0.5 and 30 g per 1000 liters of suspension liquid, preferably 3 to 10 g per 1000 l. After the flotation foamer is added, the suspension liquid is mixed thoroughly for several seconds using a stirrer. Then the plastic mixture is added and flotation performed using a known method of flotation technology.

After flotation is complete, the foam product (concentrate) and the chamber product (residue) are isolated and the suspension liquid is returned to the process. Foam and chamber products can be obtained in a simple fashion, for example by screening.

Among the plastic varieties mentioned, the hydrophilization state produced by plasma processing disappears fastest in the case of ABS. Therefore, restoration of ABS to a degree suitable for flotation establishes itself after a few hours and accordingly, before the storage time has elapsed. It is the ABS that is the most hydrophobic and therefore the foam product from the first flotation stage consists of the separated ABS. The yield and content (purity) of the various plastic fractions are definitely above 95% wt.

As a result of further storage, preferably dry storage, of the plastic mixture remaining after the first flotation stage and sinking in the flotation chamber, the hydrophobic nature of the particles increases once more, at a rate that differs depending on the material, so that after a few days a second flotation can be performed. This second flotation stage would have to be optimized by appropriate tests. The same process of drying and additional storage also applies to a third flotation stage, if one should be required. In the case of ABS, PC, SAN and PPO, the second fastest plastic to lose its hydrophilic property among those mentioned, although much slower than ABS, is PC, whose modified surface state again tends toward a hydrophobic nature. For this reason PC is floated out in a second flotation stage, and the remaining mixture of PPO and SAN has to be drained out. These last two types of plastics would have to be separated using a modified plasma processing method and one that had been optimized to separate materials that are very similar to one another, or using a basically different method. Moreover, contrary to the plastics ABS, PC, SAN, and PPO which exhibit hydrophobic behavior from the outset, in the case of polyamide (PA) plastic certain types exist that are hydrophilic from the outset and which during flotation of a plastic mixture are separated as a pure chamber product without any special pretreatment.

It has also been observed in developing this invention, that the pH value and temperature of the flotation bath have an influence on the separating effect of at least certain plastics. As already mentioned, depending on the type of plastic, the hydrophilization of the plastic particles caused by plasma processing disappears at different rates during storage. Once again, ABS is the first to become hydrophobic. Therefore a group of plastics, of which ABS is a typical representative, can be distinguished which can only by hydrophilized for a short time. On the other hand, PPO and SAN can be rendered hydrophilic by plasma processing and remain relatively stable over time. Polycarbonates (PC) occupy an intermediate position in this regard. It has now been found that the pH value of the flotation bath has no effect on either the briefly hydrophilizable ABS plastics or on the relatively time-stable hydrophilizable PPO plastics (the effect of the pH value of the flotation bath on SAN has not been studied). These types of plastics definitely behave in accordance with the pH value of the flotation bath, in other words, ABS plastics of the first group mentioned, are among the floating fraction in both alkaline and acid flotation baths, while PPO plastics, of the second group mentioned, are contained in both cases in the bottom fraction. The behavior is different in the case of the intermediate group, PC. The PC plastic behaves hydrophobically in an acid flotation bath with a pH of about 3, in other words it rises with the foam fraction, while in an alkaline flotation bath with a pH value of about 10, it behaves in a hydrophilic manner and sinks. (See Example 3, Tests a and b described below.) Acidization of the flotation bath seems to produce a trend in the case of PC plastics, that can be hydrophilized for an intermediate period of time, that resembles an effect of a longer storage time of the plasma-processed plastic particles.

Regarding the influence of the temperature of the flotation bath, heating the latter practically eliminates the different conditioning of the ABS and PC particles, in other words in an excessively overheated flotation bath, over 33° C. for example, the different ABS and PC plastic particles practically all exhibit the same degree of hydrophilic behavior, so that no particles float but the particle mixture remains nearly intact in the bottom residue. Hence, an effort should be made to ensure that the flotation bath is not heated over 30° C. in practicing certain preferred embodiments of the invention. If any heat or energy sources, for example continuous stirring of the bath liquid, are likely to lead to spontaneous heating of the bath, temperatures must be kept at acceptable values by cooling. (See Example 4, Tests a and b, referred to below.) Clearly there are material-dependent energy barriers that determine bubble adhesion and accumulation. This results in mixture-specific critical bath temperatures. For example, ABS can be separated from an ABS/PC/PPO mixture at a bath temperature of about 20° C., while this is no longer possible above 33° C. It is quite possible that the temperature influence described is not observed equally for all types of plastics. It is contemplated that for certain types of plastics there is a specific desirable temperature range for the flotation bath that differs from room temperature, at which flotation separation is especially efficient. Such a temperature influence, especially the existence of a boundary temperature or optimum temperature for the flotation bath, could be investigated and/or determined on a case-by-case basis, based on the description herein, including the specific examples given.

The purity of the plastics obtained can be checked by suitable, usually analytical, methods. In the case of plastics of different colors, the purity can be checked optically. In the case of plastics of the same color, purity can be checked using chemical methods, for example by selective solution.

Other objects, advantages and novel features of the present invention will become apparent from the following detailed description of the invention when considered in conjunction with the accompanying drawings.

BRIEF DESCRIPTION OF THE DRAWINGS

FIGS. 3, 3(a), and 3(b) respectively show a flow chart for the present invention (Example 1) in comparison to flow charts for a sample in which the plastic particles were not treated prior to flotation (Example 1, test a), and a sample in which flotation was performed directly after plasma processing of the particles (Example 1, test b).

FIGS. 5(a) and 5(b) are flow charts showing the effect of an acid (Example 3, test a) and an alkaline (Example 3, test b) flotation bath on PC plastic that is hydrophilized in an intermediate term by plasma processing.

FIGS. 6(a) and 6(b) are flow charts showing the influence of bath temperature on the effectiveness of flotation separation, according to Example 4, tests a and b.

DETAILED DESCRIPTION OF THE INVENTION

Figure 2:
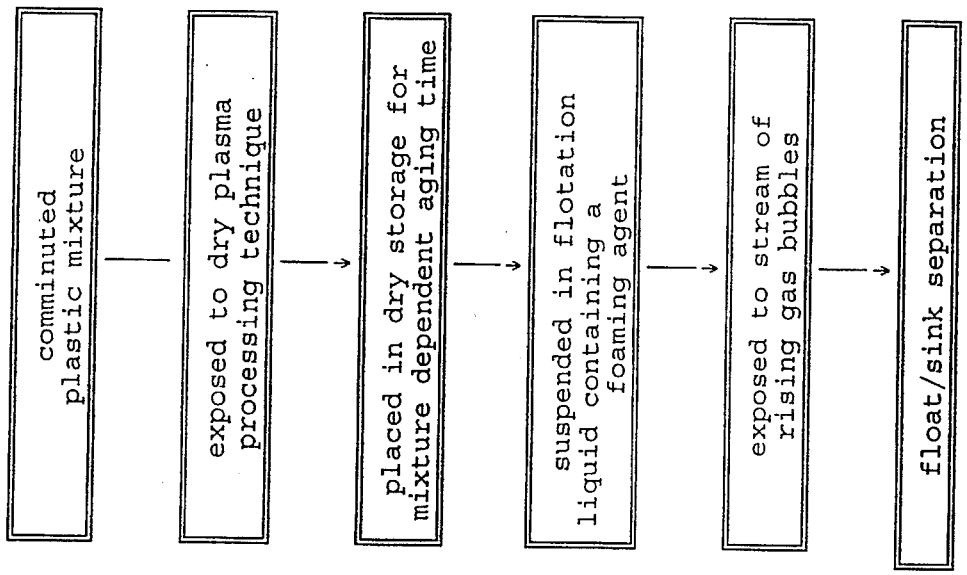
FIG. 2 is a flow chart showing the present invention.
Figure 1:
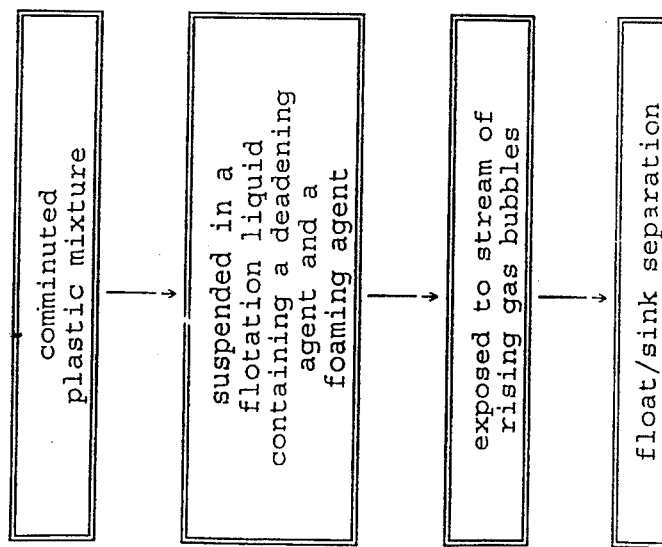
FIG. 1 is a flow chart showing the state of the prior art.
Figure 3:
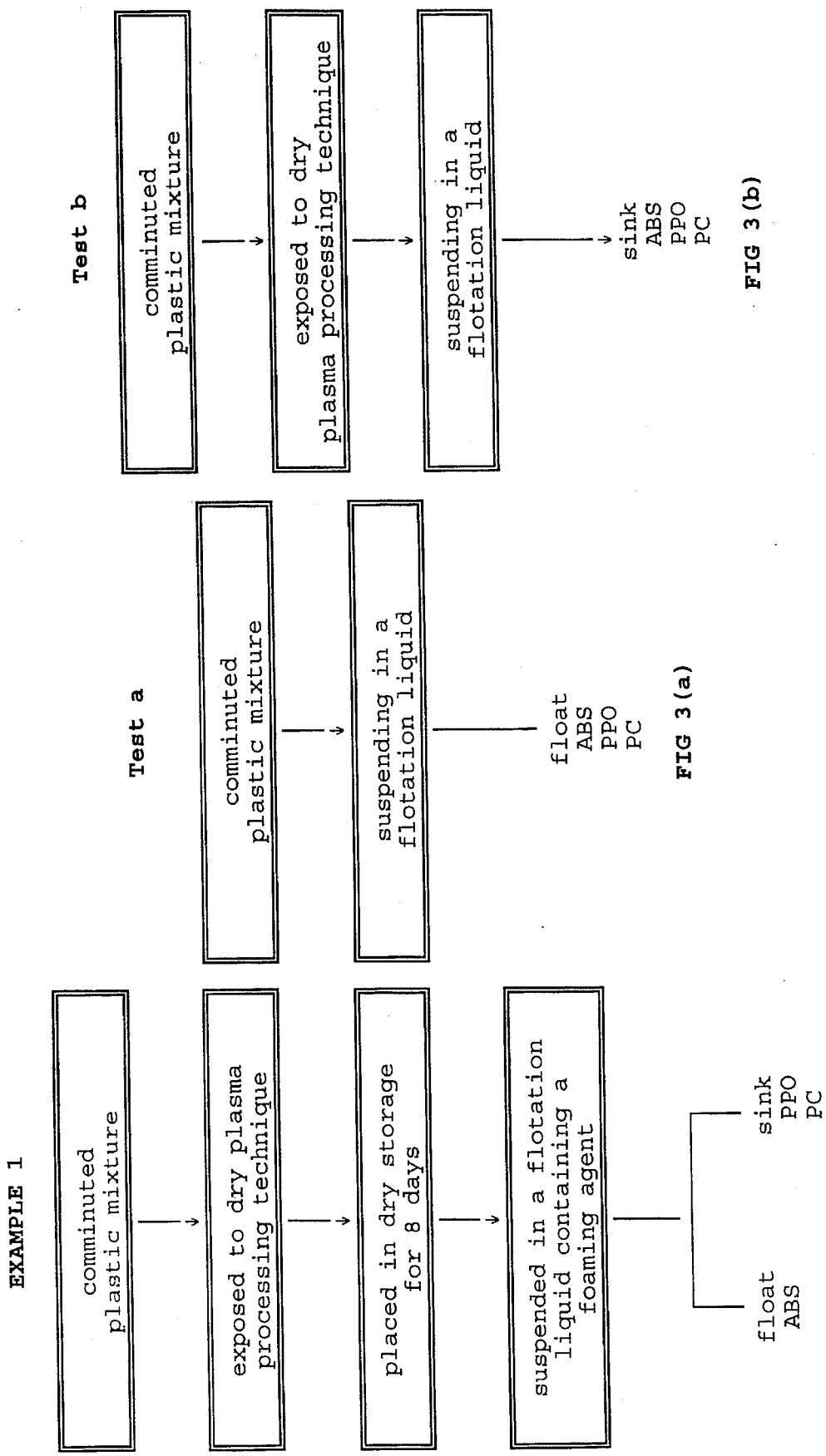
Figure 4:
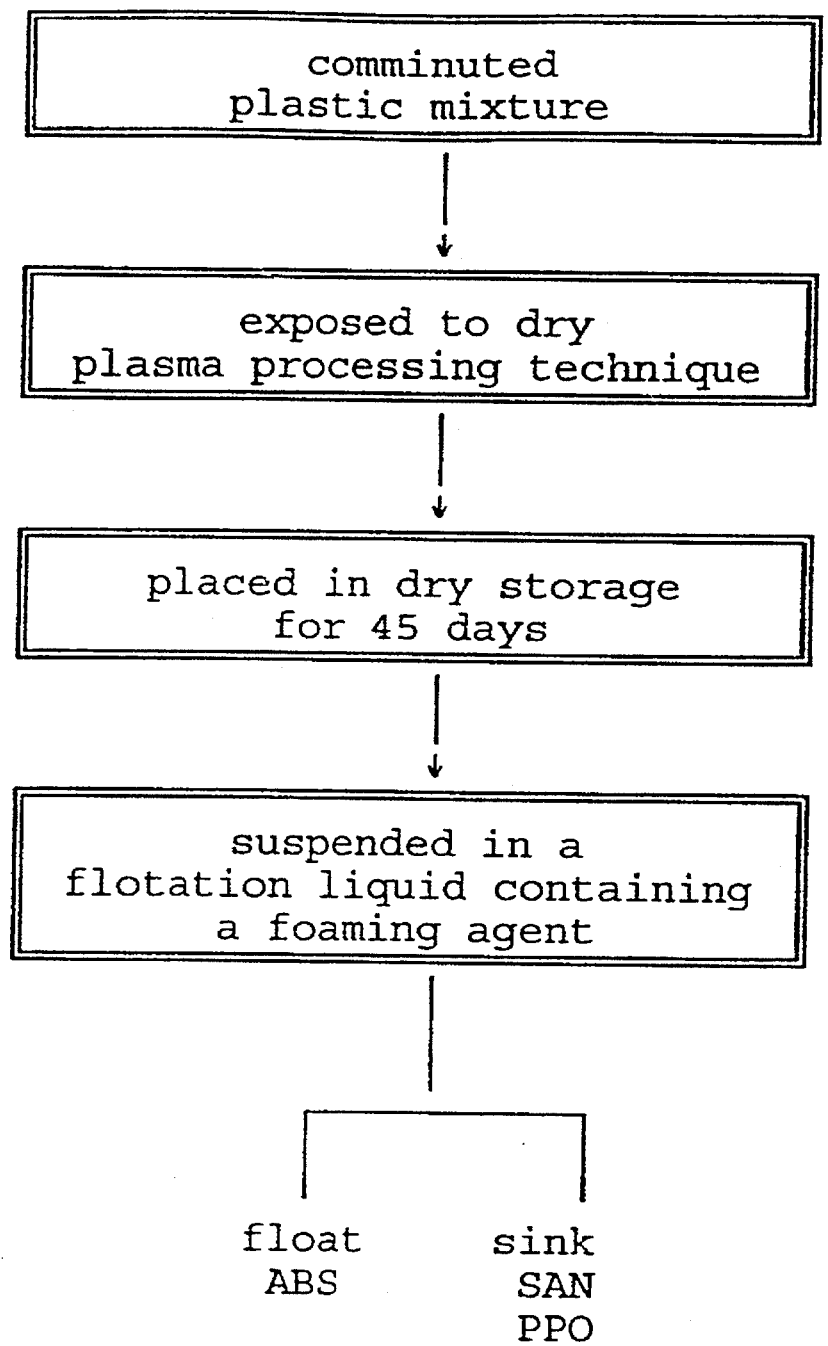
FIGS. 4 is a flow chart showing the material-specific classification obtained using conditioning by plasma pretreatment and also by subsequent storage according to Example 2.

To further explain the present invention the following examples are described. Two comparison tests according to Example 1 show that neither untreated flotation nor flotation with simple plasma processing of the plastic particles results in a separation of the mixture into its component materials. (See FIGS. 3, 3(a) and 3(b)). Example 2 shows the material-specific classification obtained using conditioning by plasma pretreatment and also by subsequent storage. (See FIG. 4). Two comparison tests according to Example 3 show the effect of an acid and an alkaline flotation bath on PC plastic that is hydrophilized in an intermediate term by plasma processing. (See FIGS. 5(a) and 5(b)). Finally, two tests in Example 4 show the influence of bath temperature on the effectiveness of flotation separation. (See FIGS. 6(a) and 6(b)).

EXAMPLE 1

A mixture of 10 g ABS (colored black to simplify purity control), 10 g PC (transparent), and 10 g PPO (colored gray) ground to a grain size of 4.0–6.3 mm was exposed in a Model R300 commercial plasma processing chamber made by Buck plasma electronic GmbH, D-79395 Neuenburg, at a base pressure of 10 Pascals, to a high frequency-excited (13.56 MHz) oxygen plasma for 10 seconds. After plasma processing, the plastic mixture was packed airtight in a sample bag and stored for 8 days. After the storage period, the plastic mixture was placed in a pneumatic flotation chamber. The chamber was filled with 9 liters tap water (pH about 8, temperature about 20° C.), to which the flotation foamer Flotanol® C7 was added at a concentration of 5.5 g per 1000 liters of water. Then flotation took place using a known method. In the foam product, 9.78 g of ABS was removed; 20.22 g of a mixture of PPO, PC, and ABS remained in the chamber product, with the latter making up 0.22 g. The foam product consisted of 100% wt. ABS.

Test a

In similar fashion, as Example 1 but without plasma processing of the plastic mixture, no separation took place. All the mixture components collected bubbles and were removed in the foam product.

Test b

In similar fashion as Example 1, but flotation was performed directly after plasma processing of the plastic mixture, likewise no separation occurred. None of the mixture components collected bubbles and therefore all the components remained in the chamber product.

EXAMPLE 2

A mixture of 10 g ABS (this time stained brown for purity control) 10 g SAN (transparent), and 10 g PPO (gray) ground to a grain size class of 4.0–6.3 mm was subjected to plasma processing as in Example 1, but this time the mixture was stored for 45 days. Subsequent flotation proceeded as in Example 1. 9.68 g of ABS was removed with the foam product while 20.32 g of SAN, PPO, and ABS remained in the chamber product, with the ABS amounting to 0.32 g. The foam product consisted of 100% wt. ABS.

EXAMPLE 3 (influence of pH value)

Test a

A mixture of 10 g ABS (black), 10 g PC (transparent), and 10 g PPO (gray) ground to a grain size of 2.5 to 4.0 mm subjected to plasma processing as in Example 1 and then stored for 20 days. The plastic mixture was then placed in a pneumatic flotation chamber. The chamber was filled with 9 liters of water at a temperature of about 20° C., to which a flotation foamer Flotanol® C7 was added at a concentration of 5.5 g per 1000 liters of water. A pH of 3 was adjusted by adding dilute sulfuric acid ($H_2SO_4$). Then flotation was performed using known methods. In the foam product, 10.00 g ABS, 9.85 g PC, and 0.21 g PPO were removed, while in the chamber product 0.15 g PC and 9.79 g PPO remained. The purity of PPO in the chamber product 98.5% wt.

Test b

In similar fashion as with Test a, but the pH was adjusted to 10 by adding dilute sodium hydroxide solution (NaOH). In the foam product, 9.98 g ABS, 0.45 g PC, and 0.04 g PPO were removed; in the chamber product 0.02 g ABS, 9.55 g PC, and 9,96 g PPO remained. The purity of the ABS product in the foam was 96% wt.

EXAMPLE 4 (influence of temperature)

Test a

A mixture of 20 g ABS, 20 g PC, and 20 g PPO ground to a grain size of 4.0 to 6.3 mm was subjected to plasma processing as in Example 1 and then stored for 20 days. The plastic mixture was then placed in a pneumatic flotation chamber. The chamber was filled with 9 liters of tap water (at a pH of about 8) to which a flotation roamer Flotanol® C7 was added at a concentration of 5.5 g per 1000 liters of water. The temperature of the flotation bath was 19° C. Then flotation was performed by known methods. In the foam product, 20.00 g ABS and 0.50 g PC were removed, while 19.50 g PC and 20.00 g PPO remained in the chamber product. The purity of the ABS in the foam product was 97.5% wt.

Test b

In similar fashion as with Test a, but the temperature of the bath liquid was about 41° C. 0.16 g ABS and 0.92 g PC were removed in the foam product; 19.84 g ABS, 19.08 g PC, and 20.00 g PPO remained in the chamber product.

One exemplary method of utilizing the present invention is as follows: 1) first expose a comminuted plastic mixture of ABS, PC, and PPO plastic particles to a dry plasma processing process; 2) place the plasma processed particles in dry storage for a material specific time; 3) suspend the plasma particles in a flotation liquid; 4) float out ABS; 5) acidify the flotation liquid, or in the alternative place the materials, that have sunk, in a second flotation bath with an acidic pH; 6) float out PC; 7) drain out PPO from the acidic flotation liquid. Following these steps according to the present invention would facilitate separation of all three plastics individually.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for separating plastic particles by types from a particle mixture of different types of plastics comprising the sequential steps of:

a) surface treating the plastic particles in a physically dry manner by plasma processing of the particle mixture to change the wettability of the plastic particles;

b) placing the plasma processed particle mixture in dry storage for a predetermined time period to further change the wettability of at least one type of plastic particle; and c) placing the stored processed particle mixture in a flotation device for separation according to wettability.

2. Method according to claim 1, comprising the step of comminuting the plastic mixture prior to said plasma processing to a particle size with a mean diameter of less than about 20 mm.

3. Method according to claim 1, wherein said plasma processing of the particle mixture is in a loose pile.

4. Method according to claim 1, wherein said plasma process of the particle mixture is continuous.

5. Method according to claim 1, wherein said plasma processing of the particle mixture is conducted over a period of about 1 to 120 seconds.

6. Method according to claim 1, wherein said plasma processing of the particle mixture is in a closed processing chamber in the presence of a high frequency-excited process gas at a pressure of less than about 200 Pa.

7. Method according to claim 1, wherein said plasma processing of the particle mixture takes place continuously through a processing section in an open atmosphere in the presence of air.

8. Method according to claim 7, wherein an atmospheric gas is excited within said processing section to form a plasma by a direct barrier discharge.

9. Method according to claim 1, wherein the plasma processed particle mixture is stored prior to flotation processing for at least about 5 hours to several days.

10. Method according to claim 1, wherein storage of the plasma processed particle mixture takes place in a loose pile in an open atmosphere.

11. Method according to claim 1, wherein said flotation device has an acid flotation bath.

12. Method according to claim 1, wherein said flotation device has an alkaline flotation bath.

13. Method according to claim 11, wherein said flotation bath is set to a constant mixture-specific optimum temperature.

14. Method according to claim 1, comprising the step of comminuting the plastic mixture prior to said plasma processing to a particle size with a diameter of about 2 to mm.

15. Method according to claim 1, wherein said plasma processing of the particle mixture is continuous with the particles separate and side by side.

16. Method according to claim 1, wherein said plasma processing of the particle mixture is over a period of about 5 to 10 seconds.

17. Method according to claim 1, wherein said plasma processing of the particle mixture is over a period of about 60 to 120 seconds.

18. Method according to claim 1, wherein said plasma processing of the particle mixture is in a closed processing chamber in the presence of oxygen.

19. Method according to claim 1, wherein said plasma processing of the particle mixture is in a closed processing chamber in the presence of a high frequency-excited process gas at a pressure of about 10 Pa.

20. Method according to claim 1, wherein said plasma processing of the particle mixture is in a closed processing chamber in the presence of a high frequency-excited process gas at a pressure of about 30 Pa.

21. Method according to claim 8, wherein the atmospheric gas is oxygen.

22. Method according to claim 8, wherein the atmospheric gas is nitrogen.

23. Method according to claim 11, wherein the flotation bath has a pH of less than about 4.

24. Method according to claim 12, wherein the flotation bath has a pH of more than 10.

25. Method according to claim 12, wherein the flotation bath is set at a constant mixture specific optimum temperature.

* * * * *